US011600986B2

(12) United States Patent
Lee et al.

(10) Patent No.: US 11,600,986 B2
(45) Date of Patent: Mar. 7, 2023

(54) SAFETY SHUTDOWN APPARATUS WITH SELF-DRIVEN CONTROL, POWER SUPPLY SYSTEM, AND METHOD OF CONTROLLING THE SAME

(71) Applicant: DELTA ELECTRONICS, INC., Taoyuan (TW)

(72) Inventors: Lei-Ming Lee, Taoyuan (TW); Wen-Yu Huang, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/166,260

(22) Filed: Feb. 3, 2021

(65) Prior Publication Data

US 2022/0045499 A1 Feb. 10, 2022

Related U.S. Application Data

(60) Provisional application No. 63/062,906, filed on Aug. 7, 2020.

(51) Int. Cl.
*H02H 3/12* (2006.01)
*H02H 3/08* (2006.01)

(52) U.S. Cl.
CPC ................ *H02H 3/12* (2013.01); *H02H 3/08* (2013.01)

(58) Field of Classification Search
CPC ..... H02J 3/08; H02J 3/12; H02H 3/08; H02H 3/12; H02S 40/34
See application file for complete search history.

(56) References Cited

U.S. PATENT DOCUMENTS 4,523,248 A 6/1985 Schmale et al.
5,714,869 A * 2/1998 Tamechika ............ H02J 7/0034 320/101
6,051,954 A * 4/2000 Nagao ............... H01L 31/02021 320/136

(Continued)

FOREIGN PATENT DOCUMENTS

EP 0 096 915 A1 12/1983
JP H0720952 A 1/1995

(Continued)

OTHER PUBLICATIONS

U.S. Appl. No. 17/166,369, filed Feb. 3, 2021.

*Primary Examiner* — Adi Amrany
(74) *Attorney, Agent, or Firm* — Muncy, Geissler, Olds & Lowe, P.C.

(57) ABSTRACT

A safety shutdown apparatus with self-driven control is coupled to a power-supplying path between a power supply apparatus and a load. The safety shutdown apparatus includes a detection unit, a controllable switch, and a drive circuit. The detection unit is coupled to the power-supplying path, and the controllable switch is coupled between a positive node and a negative node of the power-supplying path. The drive circuit is coupled to the detection unit, the power-supplying path, and the controllable switch. The drive circuit receives an output voltage of the power supply apparatus to turn on the controllable switch, and turn off the controllable switch according to whether the detection unit detects a current flowing through the power-supplying path.

8 Claims, 15 Drawing Sheets

(56) References Cited

U.S. PATENT DOCUMENTS

| | | | | |
|---|---|---|---|---|
| 8,859,884 | B2 * | 10/2014 | Dunton | H03K 17/687 370/243 |
| 8,988,840 | B2 * | 3/2015 | Mitani | H02J 7/00 361/91.1 |
| 9,343,915 | B2 * | 5/2016 | Mitani | H02J 7/0031 |
| 2004/0012986 | A1 * | 1/2004 | Riggio | H02M 3/00 363/26 |
| 2011/0063759 | A1 | 3/2011 | Billingsley et al. | |
| 2012/0153833 | A1 * | 6/2012 | Mikani | H05B 45/10 315/122 |
| 2013/0106469 | A1 * | 5/2013 | Slavov | H03K 17/18 327/109 |
| 2013/0320767 | A1 | 12/2013 | Huang et al. | |
| 2014/0192564 | A1 * | 7/2014 | Tang | H02M 3/33592 363/21.14 |
| 2014/0301003 | A1 * | 10/2014 | Jankowski | H01L 31/02021 361/57 |
| 2015/0373790 | A1 * | 12/2015 | Boswinkel | H05B 47/19 315/186 |
| 2016/0006392 | A1 * | 1/2016 | Höft | H02H 11/00 361/78 |
| 2016/0056715 | A1 | 2/2016 | Arisawa et al. | |
| 2018/0366945 | A1 | 12/2018 | Braginsky et al. | |
| 2022/0294389 | A1 * | 9/2022 | Luo | H02S 40/34 |

FOREIGN PATENT DOCUMENTS

| | | | |
|---|---|---|---|
| JP | 2011024303 | A | 2/2011 |
| JP | 2013252046 | A | 12/2013 |
| WO | WO 85/00933 | A1 | 2/1985 |
| WO | WO 2020/119332 | A1 | 6/2020 |

* cited by examiner

SAFETY SHUTDOWN APPARATUS WITH SELF-DRIVEN CONTROL, POWER SUPPLY SYSTEM, AND METHOD OF CONTROLLING THE SAME

CROSS-REFERENCE TO RELATED APPLICATION

This patent application claims the benefit of U.S. Provisional Patent Application No. 63/062,906, filed Aug. 7, 2020, which is incorporated by reference herein.

BACKGROUND

Technical Field

The present disclosure relates to a safety shutdown apparatus with self-driven control, a power supply system, and a method of controlling the same.

Description of Related Art

The statements in this section merely provide background information related to the present disclosure and do not necessarily constitute prior art.

As shown in FIG. 1, a shutdown apparatus 4 is usually installed between a power supply apparatus 2 and a load 3 for safety considerations when the conventional power supply apparatus supplies power to the load 3 so as to avoid that there is still electricity on transmission lines between the power supply apparatus 2 and the load 3 once the load 3 occurs unexpected problems. The conventional shutdown apparatus 4 may operate in the following manners. 1. Both the load 3 and the shutdown apparatus 4 need additional communication units 5, and the communication units 5 are coupled and communicate to each other by a signal line L so that the shutdown apparatus 4 is provided to connect or disconnect the power supply apparatus 2 with the load 3. 2. The shutdown apparatus 4 is a manual switch, and the operator manipulates the shutdown apparatus 4 according to the condition of the load 3.

No matter which manner is used, the costs of the power supply system, including labor cost, circuit cost, and so forth are significantly increased. Therefore, how to design a safety shutdown apparatus with self-driven control, a power supply system, and a method of controlling the same to operate in a safe operation mode or a normal operation mode is a major issue that the inventors of the present disclosure want to overcome and solve.

SUMMARY

In order to solve the above-mentioned problems, the present disclosure provides a safety shutdown apparatus with self-driven control. The safety shutdown apparatus with self-driven control is coupled to a power-supplying path between a power supply apparatus and a load. The safety shutdown apparatus includes a detection unit, a controllable switch, and a drive circuit. The detection unit is coupled to the power-supplying path, and generates a current confirmation signal according to a current flowing through the power-supplying path. The controllable switch is coupled between a positive node and a negative node of the power-supplying path, and provides a short-circuit path passing through the positive node, the controllable switch, and the negative node. The drive circuit is coupled to the detection unit, the power-supplying path, and the controllable switch, and receives an output voltage provided from the power supply apparatus to turn on the controllable switch, and turns off the controllable switch according to the current confirmation signal.

In order to solve the above-mentioned problems, the present disclosure provides a power supply system. The power supply system includes a plurality of power supplies, and each power supply is coupled to a load through a safety shutdown apparatus.

In order to solve the above-mentioned problems, the present disclosure provides a power supply system. The power supply system includes a plurality of power supplies, and each power supply includes a plurality of power supply units with outputs connected in series, and each power supply is coupled to a load through a safety shutdown apparatus.

In order to solve the above-mentioned problems, the present disclosure provides a method of controlling a safety shutdown apparatus. The method includes steps of: (a) detecting whether a current flowing through a power-supplying path between a power supply apparatus and a load, (b) turning off a controllable switch coupled between a positive node and a negative node of the power-supplying path when the current flowing through the power-supplying path is detected, and (c) turning on the controllable switch when the current is not detected.

The main purpose and effect of the present disclosure are that the safety shutdown apparatus is self-driven to provide the short-circuit path and operates in a safe operation mode when the power supply apparatus outputs voltage but the load does not draw current so that the output voltage of the power supply apparatus can be maintained at a low voltage. Also, the safety shutdown apparatus is self-driven to disconnect the short-circuit path and operates in a normal operation mode when the power supply apparatus outputs voltage and the load draws current.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
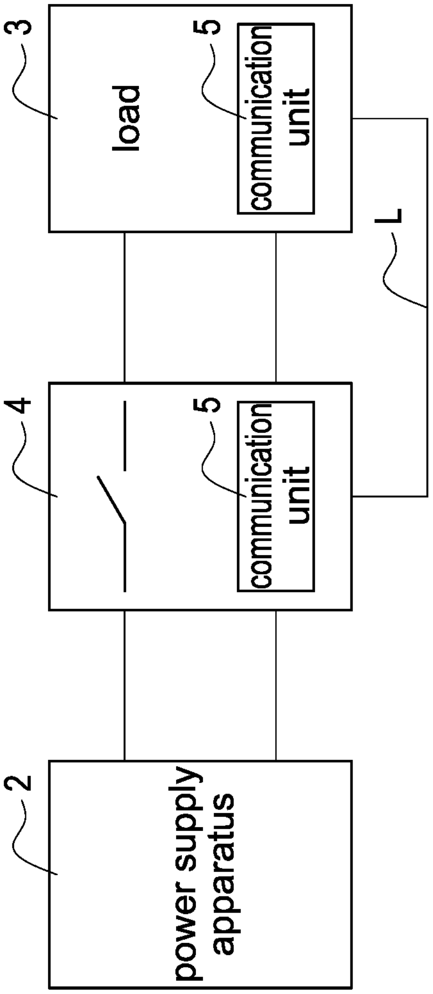
FIG. 1 is a block diagram of a conventional power supply system.

Reference will now be made to the drawing figures to describe the present disclosure in detail. It will be understood that the drawing figures and exemplified embodiments of present disclosure are not limited to the details thereof.

Figure 2:
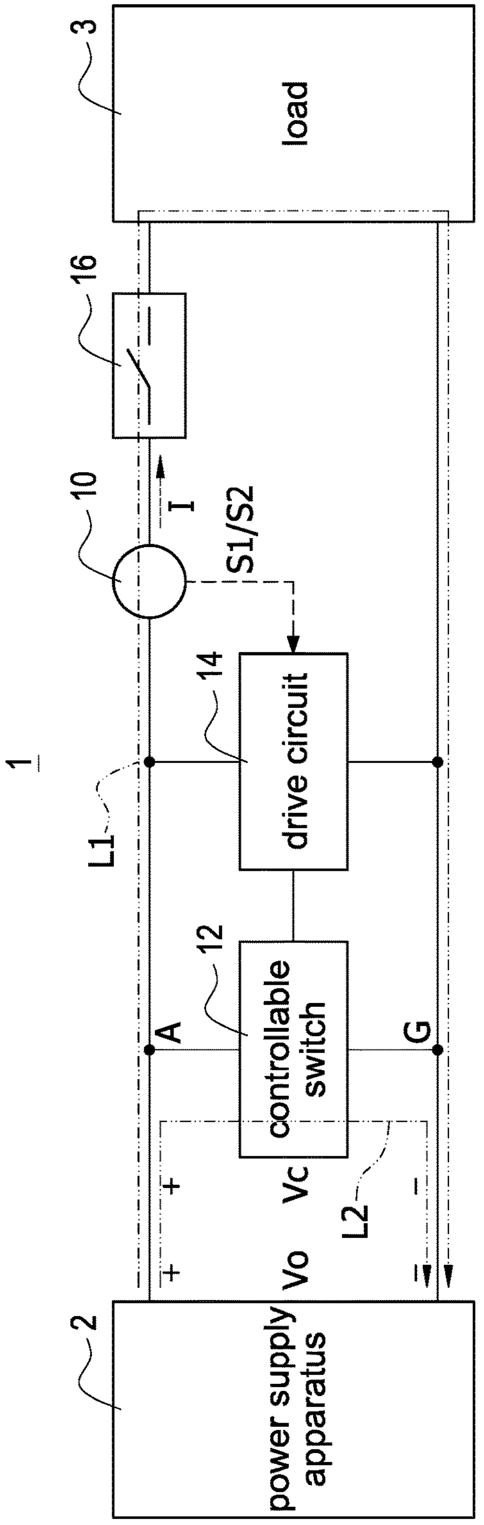
FIG. 2 is a block circuit diagram of a safety shutdown apparatus with self-driven control according to the present disclosure.

Please refer to FIG. 2, which shows a block circuit diagram of a safety shutdown apparatus with self-driven control according to the present disclosure. The safety shutdown apparatus 1 is coupled to a power-supplying path L1 between a power supply apparatus 2 and a load 3.

According to operation conditions of the power supply apparatus 2 and the load 3, the safety shutdown apparatus 1 operates in a safe operation mode or a normal operation mode. In different embodiments, the power supply apparatus 2 may be, for example but not limited to, a power supply or a solar panel with a plurality of photovoltaic cells. The safety shutdown apparatus 1 includes a detection unit 10, a controllable switch 12, and a drive circuit 14. The detection unit 10 is coupled to the power-supplying path L1. In different embodiments, the detection unit 10 may be, for example but not limited to, a Hall sensor, current transformer, a current shunt for detecting a current flowing through the power-supplying path L1. The controllable switch 12 is coupled between a positive node A and a negative node G of the power-supplying path L1, and a short-circuit path L2 is provided passing through the positive node A, the controllable switch 12, and the negative node G. The positive node A here refers to any node on a positive-voltage transmission line of the power supply apparatus 2, and the negative node G here refers to any node on a negative-voltage transmission line of the power supply apparatus 2. In particular, the positive node A and the negative node G are preferably closer to the power supply apparatus 2. The drive circuit 14 is coupled to the detection unit 10, the power-supplying path L1, and the controllable switch 12, and the short-circuit path L2 is connected or disconnected according to whether a current I flowing through the power-supplying path L1 is detected by the detection unit 10 or not.

Specifically, the safety shutdown apparatus 1 is provided to turn on the controllable switch 12 to operate in the safe operation mode when the power supply apparatus 2 provides an output voltage Vo but the load 3 does not draw current (for example, out of order or under repair) so that the output voltage Vo can be maintained at a low voltage, for example but not limited to 1 volt. The output voltage Vo is substantially equal to a voltage VC across two ends of the controllable switch 12. The drive circuit 14 is coupled to the power-supplying path L1, and receives an output voltage Vo provided from the power supply apparatus 2 to turn on the controllable switch 12. When the detection unit 10 does not detect the current I flowing through the power-supplying path L1, the detection unit 10 does not output any signal or outputs a no-load signal S2. For example, a pull-down resistor may be used to output a signal with a low level as the no-load signal S2. Therefore, the drive circuit 14 is unaffected and the controllable switch 12 is still turned on. At this condition, the power supply apparatus 2, the positive node A, the controllable switch 12, and the negative node G form a closed loop. The output voltage Vo of the power supply apparatus 2 is pulled to be substantially equal to the voltage Vc across two ends of the controllable switch 12.

Although a low voltage, the load 3 still can draw current to generate the current I. When the detection unit 10 detects the current I flowing through the power-supplying path L1, the detection unit 10 generates a current confirmation signal S1 according to the current I, such as a voltage signal with a high level, and the drive circuit 14 turns off the controllable switch 12 according to the current confirmation signal S1 so that the short-circuit path L2 is disconnected. At this condition, the output voltage Vo of the power supply apparatus 2 is provided to the load 3 so that the safety shutdown apparatus 1 operates in the normal operation mode. Also refer to FIG. 2 again, the safety shutdown apparatus 1 further includes a path switch 16, and the path switch 16 is coupled to the power-supplying path L1 and its coupling position is not limited. The path switch 16 is an optional safety component for connecting or disconnecting the power supply apparatus 2 with the load 3. The path switch 16, for example but not limited to a relay, a tactile switch, a knife switch, and so forth, can be directly or indirectly manipulated to be turned on or turned off.

Figure 3:
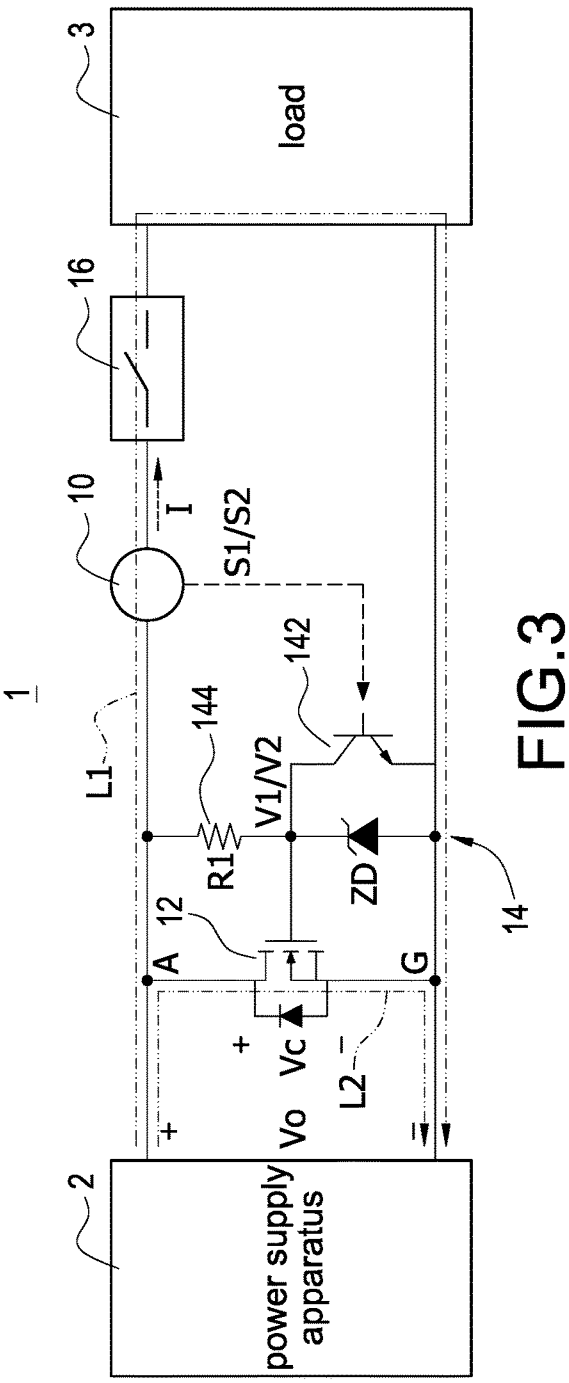
FIG. 3 is a block circuit diagram of the safety shutdown apparatus with self-driven control according to a first embodiment of the present disclosure.

Please refer to FIG. 3, which shows a block circuit diagram of the safety shutdown apparatus with self-driven control according to a first embodiment of the present disclosure, and also refer to FIG. 2. The drive circuit 14 includes a first switch 142 and a regulation circuit 144. The first switch 142 is coupled to the detection unit 10 and the regulation circuit 144, and the regulation circuit 144 is coupled to the controllable switch 12 and the power-supplying path L1. The first switch 142 is turned on according to the current confirmation signal S1 so that the regulation circuit 144 generates the first voltage V1 or the second voltage V2 according to the state of the first switch 142. Therefore, the first voltage V1 and the second voltage V2 are provided to turn on or turn off the controllable switch 12, thereby connecting or disconnecting the short-circuit path L2.

As shown in FIG. 3, the first switch 142 may be, for example but not limited to, a semiconductor switch component, such as a bipolar junction transistor (BJT) or a metal-oxide semiconductor field-effect transistor (MOSFET). The regulation circuit 144 includes a first resistor R1 and a regulation unit ZD. One end of the first resistor R1 is coupled to one end of the regulation unit ZD, the first switch 142, and the controllable switch 12. The regulation unit ZD may be, for example but not limited to, a regulation component, such as a transient voltage suppression (TVS) diode or a Zener diode. In different embodiments, the positions of the first resistor R1 and the regulation unit ZD can be interchanged. The controllable switch 12 may be, for example but not limited to, a switch component, such as a BJT, a MOSFET, or a relay, also further includes other electronic components, such as a resistor, a capacitor, or a diode.

In the normal operation mode, as shown in FIG. 3, when the detection unit 10 does not detect the current I, the detection unit 10 outputs the no-load signal S2 to turn off the first switch 142 since the load 3 has stopped drawing current. At this condition, the output voltage Vo of the power supply apparatus 2 results in a second voltage V2 at a node between the first resistor R1 and the regulation unit ZD. In this embodiment, the second voltage V2 is a reverse breakdown voltage of the regulation unit ZD. The second voltage V2 drives the controllable switch 12 to be turned on so that the short-circuit path L2 is connected. When the controllable switch 12 is turned on, the power supply apparatus 2, the positive node A, the controllable switch 12, and the negative node G form a closed loop so that the output voltage Vo of the power supply apparatus 2 is pulled to be substantially equal to the voltage Vc across two ends of the controllable switch 12. At this condition, the controllable switch 12 keeps turning on. In this embodiment, since the controllable switch 12 is the MOSFET, a voltage Vc across two ends of the controllable switch 12 is the drain-source voltage Vds of the MOSFET which is turned on. When the load 3 stops drawing current, the safety shutdown apparatus 1 operates from the normal operation mode to the safe operation mode so that the output voltage Vo of the power supply apparatus 2 can be maintained at a low voltage, such as 1 volt.

When the detection unit 10 detects the current I and provides the current confirmation signal S1 to the first switch 142, that is, the load 3 draws current, the first switch 142 is turned on by the current confirmation signal S1 so that the node between the first resistor R1 and the regulation unit ZD is connected to the negative node G and a first voltage V1 is generated at the node between the first resistor R1 and the regulation unit ZD, and the first voltage V1 drives the controllable switch 12 to be turned off so that the short-circuit path L2 is disconnected. At this condition, the output voltage Vo of the power supply apparatus 2 is provided to the load 3.

Figure 4A:
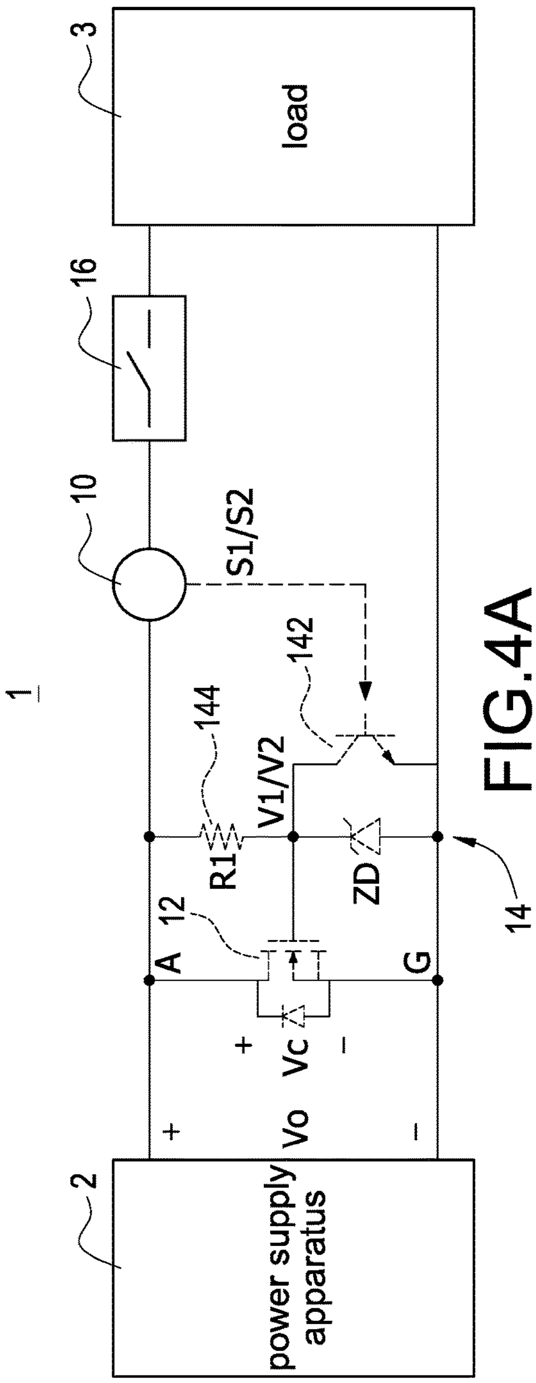
FIG. 4A is a block circuit diagram of operating the safety shutdown apparatus in a first action according to the first embodiment of the present disclosure.
Figure 4B:
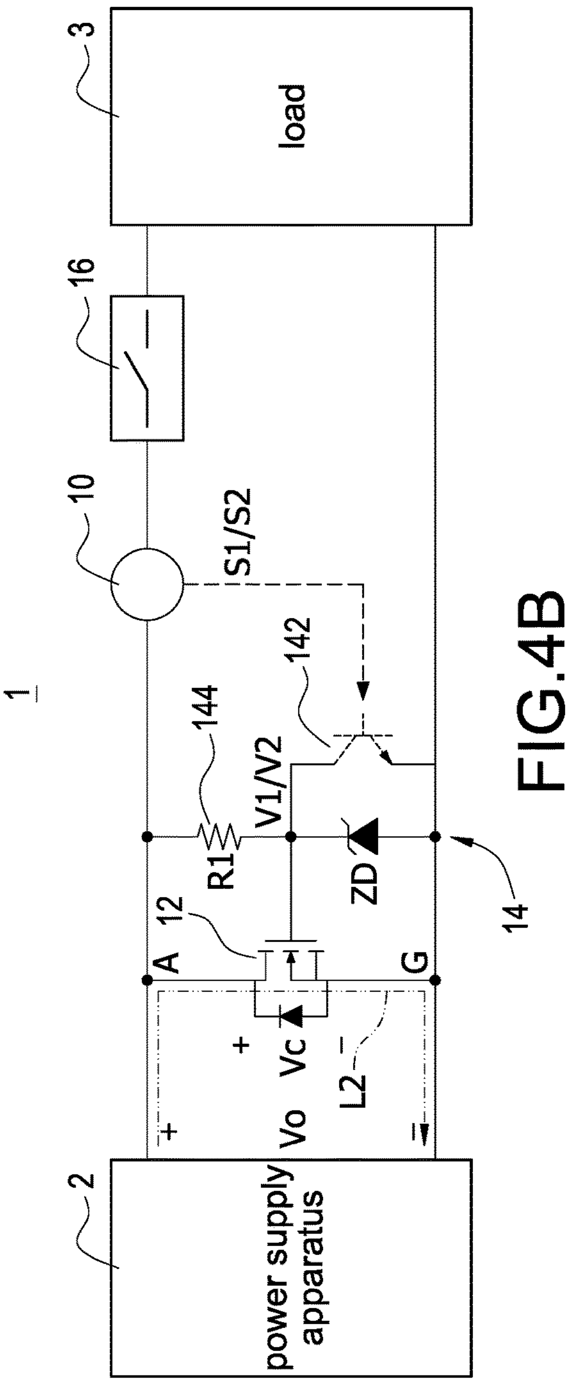
FIG. 4B is a block circuit diagram of operating the safety shutdown apparatus in a second action according to the first embodiment of the present disclosure.

Please refer to FIG. 4A through FIG. 4D, which show block circuit diagrams of operating the safety shutdown apparatus according to the first embodiment of the present disclosure, and also refer to FIG. 3. The controllable switch 12 shown in FIG. 4A through FIG. 4D takes an enhancement-type MOSFET as an example. If the controllable switch 12 takes a depletion-type MOSFET as an example, the operation principle is similar except that it is originally turned on. In FIG. 4A, if the output voltage Vo of the power supply apparatus 2 is zero volt, the components inside the safety shutdown apparatus 1 do not work (are not in operation), and therefore these components are represented by dashed lines. In FIG. 4B, the components in operation are represented by solid lines and the components not in operation are represented by dashed lines. If the output voltage Vo is 10 volts and the load 3 does not draw current, the controllable switch 12 is turned on by the second voltage V2 at the node between the first resistor R1 and the regulation unit ZD so that the controllable switch 12 works in a linear region. Since the controllable switch 12 is turned on, the output voltage Vo of the power supply apparatus 2 is pulled to be substantially equal to the voltage Vc, for example but not limited to 1 volt, across two ends of the controllable switch 12. The voltage Vc can supply the detection unit 10 to make the detection unit 10 operate. Accordingly, the components inside the safety shutdown apparatus 1 can be self-driven without external signals or external power supply so that the safety shutdown apparatus 1 can operate in the safe operation mode or the normal operation mode. As long as the load 3 does not draw current, the safety shutdown apparatus 1 operates in the safe operation mode automatically.

Figure 4C:
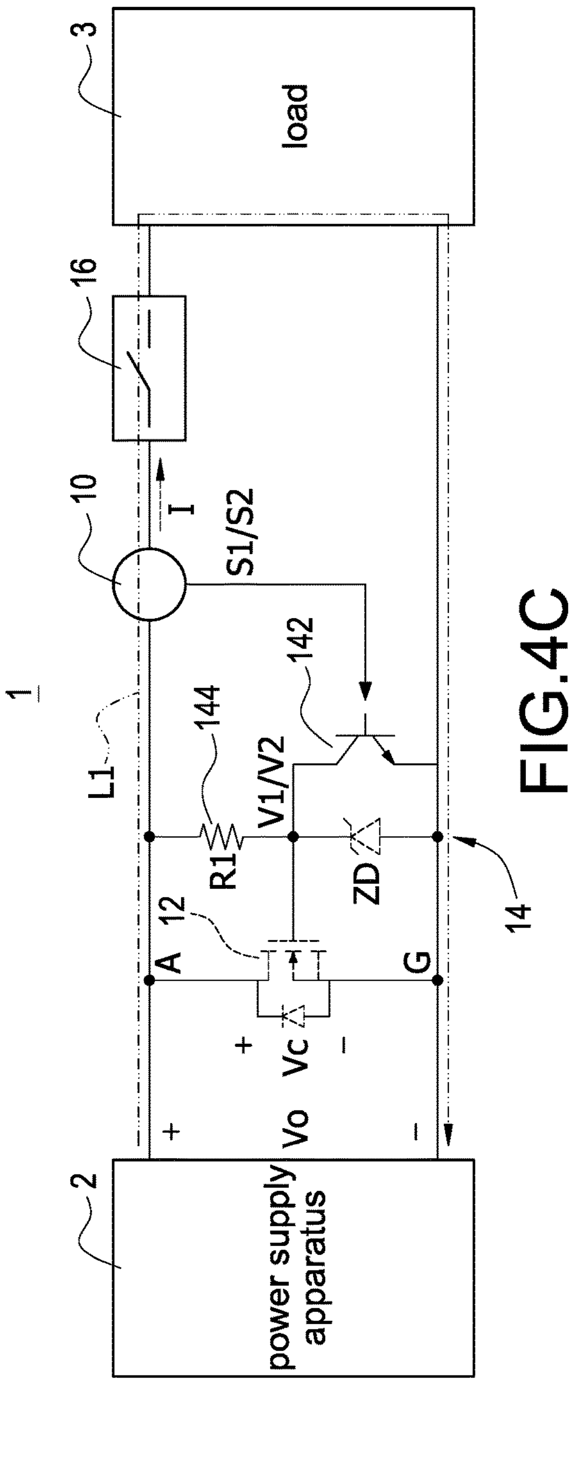
FIG. 4C is a block circuit diagram of operating the safety shutdown apparatus in a third action according to the first embodiment of the present disclosure.
Figure 4D:
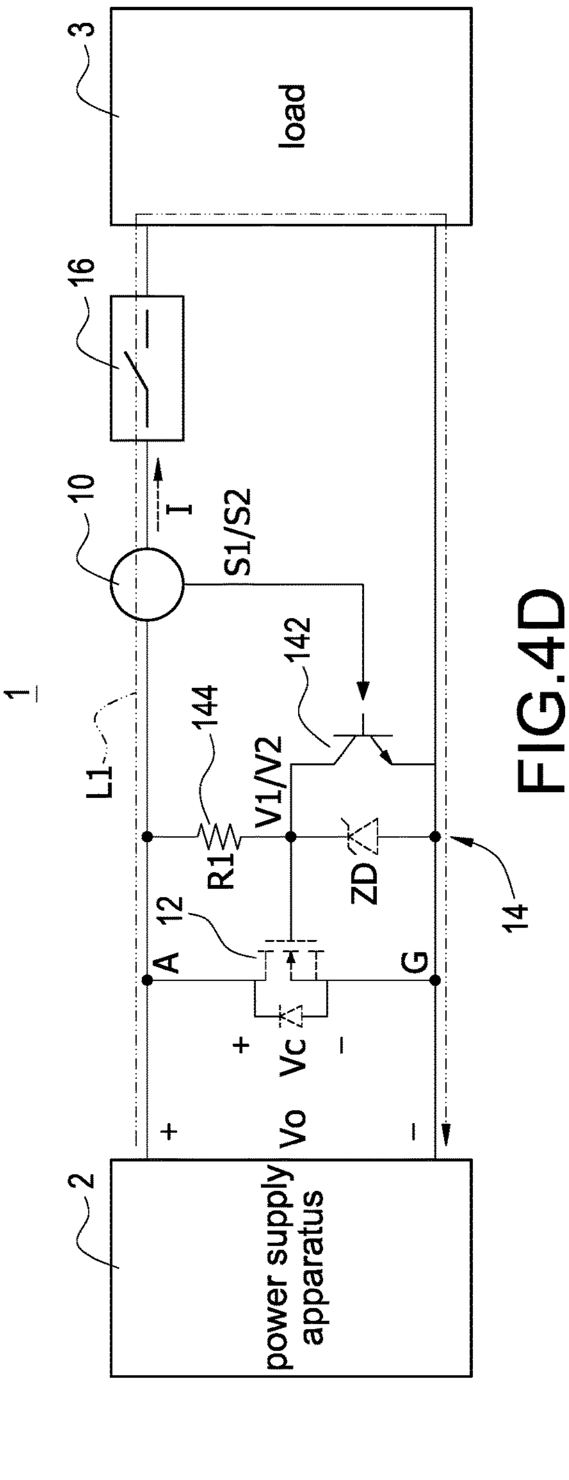
FIG. 4D is a block circuit diagram of operating the safety shutdown apparatus in a fourth action according to the first embodiment of the present disclosure.

In FIG. 4C, the components in operation are represented by solid lines and the components not in operation are represented by dashed lines. When the load 3 draws current to generate the current I flowing through the power-supplying path L1, the voltage Vc can provide the voltage for the load 3 although the voltage Vc is not high. At this condition, the detection unit 10 detects the current I and generates the current confirmation signal S1 to drive the first switch 142 to be turned on. In FIG. 4D, the components in operation are represented by solid lines and the components not in operation are represented by dashed lines. Since the first switch 142 is turned on, the controllable switch 12 is turned off by the first voltage V1 at the node between the first resistor R1 and the regulation unit ZD so that the controllable switch 12 is in an open-circuit condition. At this condition, the output voltage Vo is restored to 10 volts. In one embodiment, the resistance of the first resistor R1 may be designed to a high resistance so that most of the current will flow through the load 3.

Figure 5:
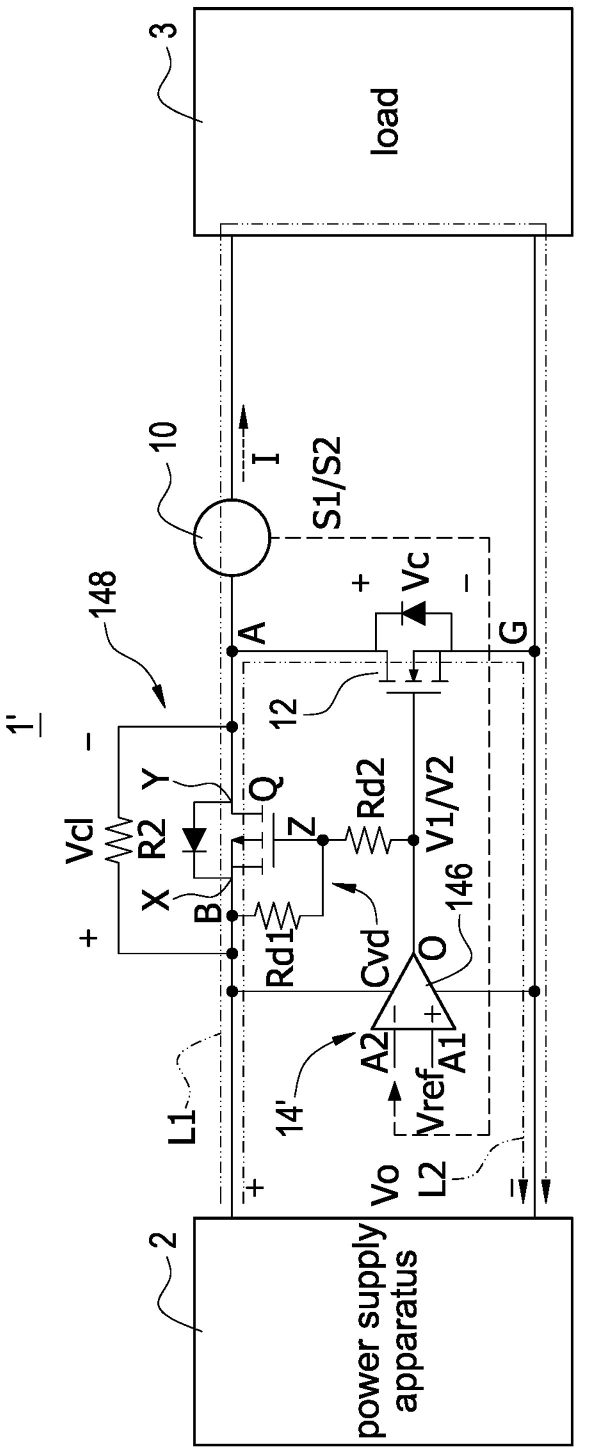
FIG. 5 is a block circuit diagram of the safety shutdown apparatus with self-driven control according to a second embodiment of the present disclosure.

Please refer to FIG. 5, which shows a block circuit diagram of the safety shutdown apparatus with self-driven control according to a second embodiment of the present disclosure, and also refer to FIG. 1 through FIG. 4D. The drive circuit 14' of the safety shutdown apparatus 1' includes a comparison unit 146 having a first input end A1, a second input end A2, and an output end O. The first input end A1 receives a reference voltage Vref, the second input end A2 is coupled to the detection unit 10, and the output end O is coupled to the controllable switch 12. In one embodiment, the reference voltage Vref may be acquired by dividing the output voltage Vo of the power supply apparatus 2 through a voltage divider circuit. The comparison unit 146 compares the signal outputted from the detection unit 10 with the reference voltage Vref, and the controllable switch 12 is turned on or turned off according to the comparison result, thereby connecting or disconnecting the short-circuit path L2.

The drive circuit 14' further includes a clamping circuit 148. The clamping circuit 148 is coupled to the drive circuit 14', the controllable switch 12, and the power-supplying path L1. The clamping circuit 148 makes the power-supplying path L1 connect or provides a clamping voltage Vcl to the short-circuit path L2 according to whether the detection unit 10 detects the current I. When the detection unit 10 does not detect the current I, the clamping circuit 148 provides the clamping voltage Vcl to the short-circuit path L2 so that a total voltage of the voltage Vc across the controllable switch 12 plus the clamping voltage Vcl is sufficient to drive the comparison unit 146 (or the detection unit 10). In addition, the clamping circuit 148 is also used to limit the current flowing through the short-circuit path L2 to avoid excessive current flowing through the controllable switch 12. When the detection unit 10 detects the current I, the clamping circuit 148 makes the power-supplying path L1 connect without providing the clamping voltage Vcl.

As shown in FIG. 5, the clamping circuit 148 includes a voltage divider circuit Cvd, a second switch Q, and a second resistor R2. The voltage divider circuit Cvd includes a first voltage-dividing resistor Rd1 and a second voltage-dividing resistor Rd2 connected in series. The first voltage-dividing resistor Rd1 is coupled to a node B on the power-supplying path L1, and the node B is between the positive node A and the power supply apparatus 2; the second voltage-dividing resistor Rd2 is coupled to the drive circuit 14' and the controllable switch 12. The second switch Q has a first end X, a second end Y, and a control end Z. The first end X is coupled to the node B, the second end Y is coupled to the positive node A, and the control end Z is coupled to the first voltage-dividing resistor Rd1 and the second voltage-dividing resistor Rd2. One end of the second resistor R2 is coupled to the first end X, and the other end of the second resistor R2 is coupled to the second end Y. In particular, the action of the second switch Q is opposite to that of the controllable switch 12, that is, when the controllable switch 12 is turned on, the second switch Q is turned off, and vice-versa.

As shown in FIG. 5, when the detection unit 10 does not detect the current I and provides the no-load signal S2 to the second input end A2, that is, the load 3 does not draw current, the comparison unit 146 compares the no-load signal S2 with the reference voltage Vref to generate the second voltage V2. The controllable switch 12 is driven by the second voltage V2 to be turned on. When the detection unit 10 detects the current I and provides the current confirmation signal S1 to the second input end A2, that is, the load 3 draws current, the comparison unit 146 compares the current confirmation signal S1 with the reference voltage Vref to generate the first voltage V1. The controllable switch 12 is driven by the first voltage V1 to be turned off.

As shown in FIG. 5, take the second switch Q as a P-type MOSFET as an example. When the drive circuit 14' provides the second voltage V2, a smaller voltage is generated between the first end X and the control end Z so that the second switch Q is turned off. At this condition, the short-circuit path L2 passes through the second resistor R2 to generate the clamping voltage Vcl on the second resistor R2, and the second resistor R2 provides the resistance to the short-circuit path L2 to limit the current flowing through the controllable switch 12. A total voltage of the clamping voltage Vcl plus the voltage Vc across the controllable switch 12 is provided to the comparison unit 146 so that the output voltage Vo, the clamping voltage Vcl plus the voltage Vc, is easier to drive the comparison unit 146 when the controllable switch 12 is turned on (short-circuit). When the drive circuit 14' provides the first voltage V1, a greater voltage is generated between the first end X and the control end Z so that the second switch Q is turned on. At this condition, the power-supplying path L1 passes through the second switch Q so that the second resistor R2 is bypassed without providing the clamping voltage Vcl, thereby reducing the resistance loss of the power-supplying path L1. The components, coupling relationships, and operation actions not mentioned in this embodiment are all similar to those in FIG. 3, and will not be repeated here. In addition, the clamping circuit 148 in this embodiment is also applicable to the safety shutdown apparatus 1 shown in FIG. 3 to increase self-driven voltage (for driving the detection unit 10 and the comparison unit 146) and provide the current-limiting function.

Figure 6A:
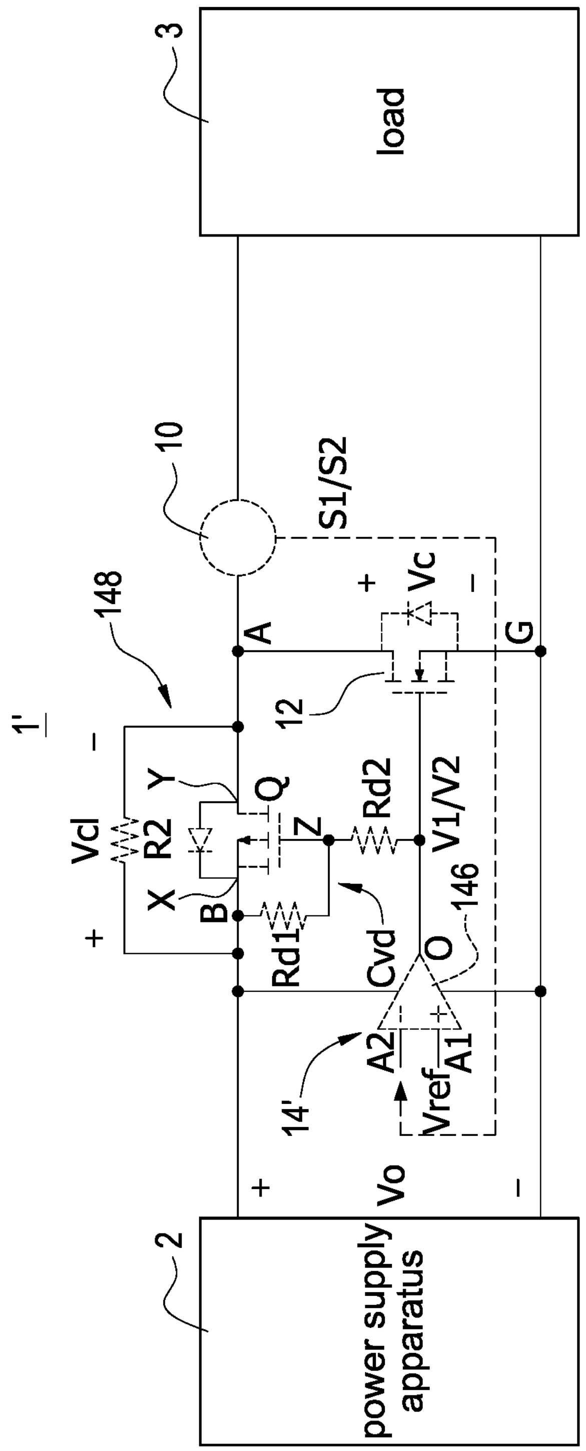
FIG. 6A is a block circuit diagram of operating the safety shutdown apparatus in a first action according to the second embodiment of the present disclosure.
Figure 6B:
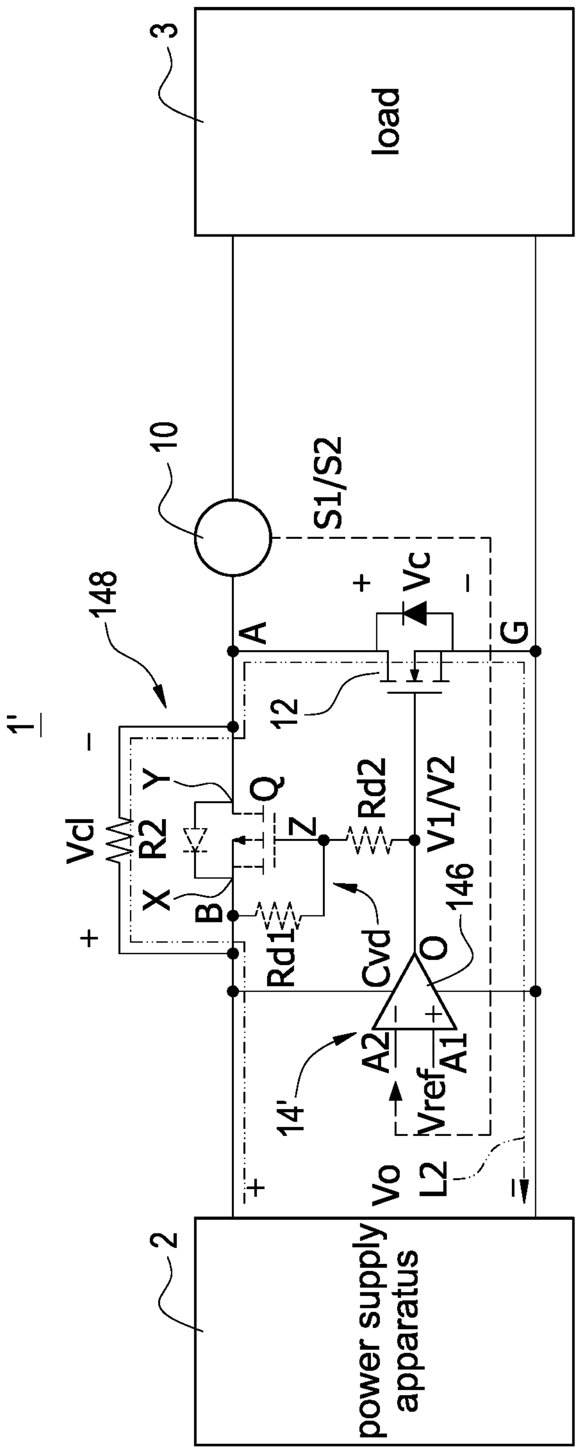
FIG. 6B is a block circuit diagram of operating the safety shutdown apparatus in a second action according to the second embodiment of the present disclosure.
Figure 6C:
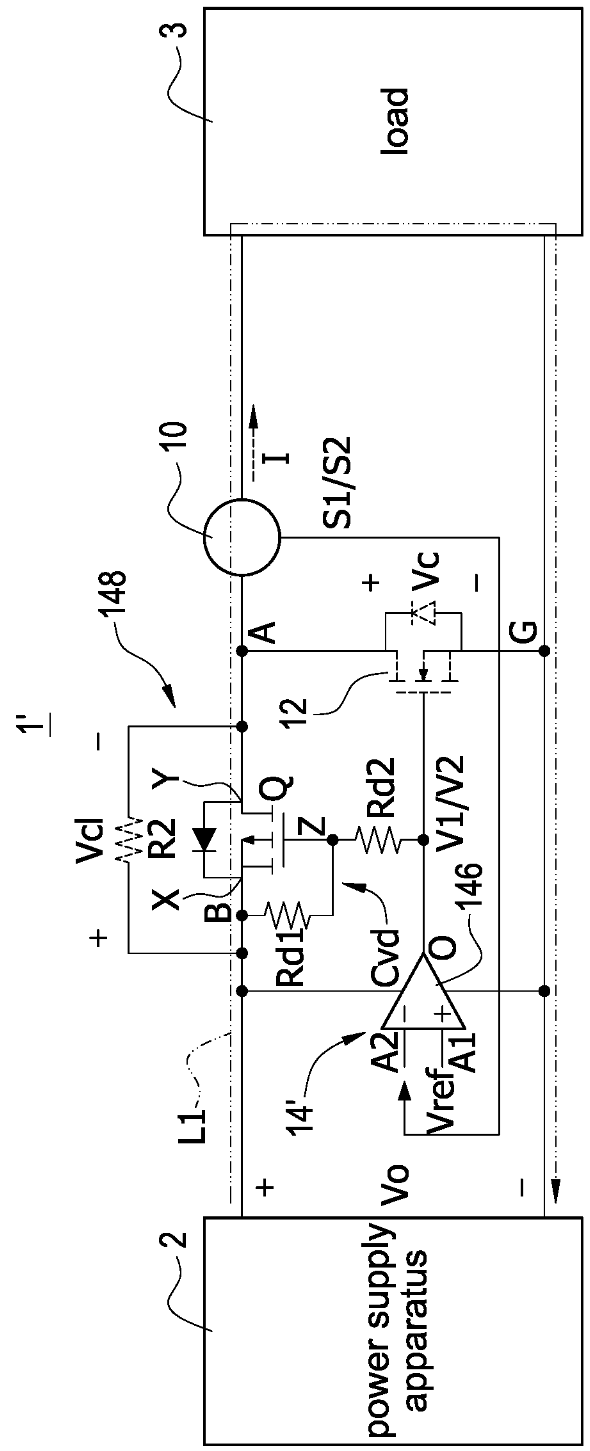
FIG. 6C is a block circuit diagram of operating the safety shutdown apparatus in a third action according to the second embodiment of the present disclosure.

Please refer to FIG. 6A through FIG. 6C, which show block circuit diagrams of operating the safety shutdown apparatus according to the second embodiment of the present disclosure. In FIG. 6A, if the output voltage Vo of the power supply apparatus 2 is zero volt, the components inside the safety shutdown apparatus 1' do not work (are not in operation), and therefore these components are represented by dashed lines. In FIG. 6B, the components in operation are represented by solid lines and the components not in operation are represented by dashed lines. If the output voltage Vo is 10 volts and the load 3 does not draw current, the detection unit 10 outputs the no-load signal S2 with a low level. Since the reference voltage Vref is greater than the no-load signal S2, the comparison unit 146 provides the second voltage V2. The comparison unit 146 can be directly supplied power by the output voltage Vo or by a regulation circuit, such as a linear regulator or a step-down module. Therefore, the comparison unit 146 outputs the second voltage V2 according to the received output voltage Vo to turn on the controllable switch 12 and turn off the second switch Q. At this condition, the node B, the second resistor R2, the positive node A, the controllable switch 12, and the negative node G form a loop so that the positive node A can provide a voltage for the load 3 to draw current when the second switch Q is turned off. In one embodiment, the resistance of the second resistor R2 can be large to ensure that the output voltage Vo is sufficient to drive the comparison unit 146.

In FIG. 6C, the components in operation are represented by solid lines and the components not in operation are represented by dashed lines. Since the load 3 draws current, the detection unit 10 outputs the current confirmation signal S1. Since the current confirmation signal S1 is greater than the reference voltage Vref, the comparison unit 146 provides the first voltage V1 to turn off the controllable switch 12. In addition, the output voltage Vo is divided by the first voltage-dividing resistor Rd1 and the second voltage-dividing resistor Rd2 to turn on the second switch Q to complete the activation (startup).

Figure 7A:
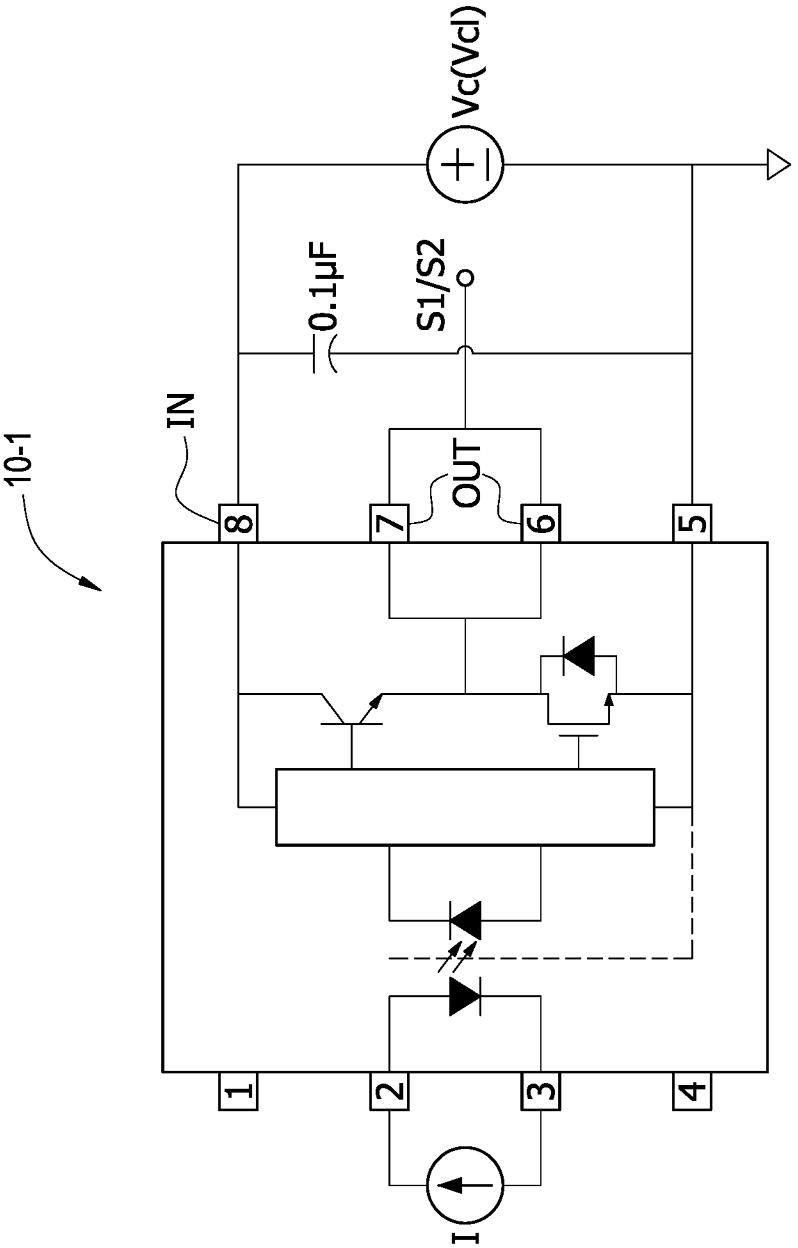
FIG. 7A is a circuit diagram of a first embodiment of the detection unit of the present disclosure.
Figure 7B:
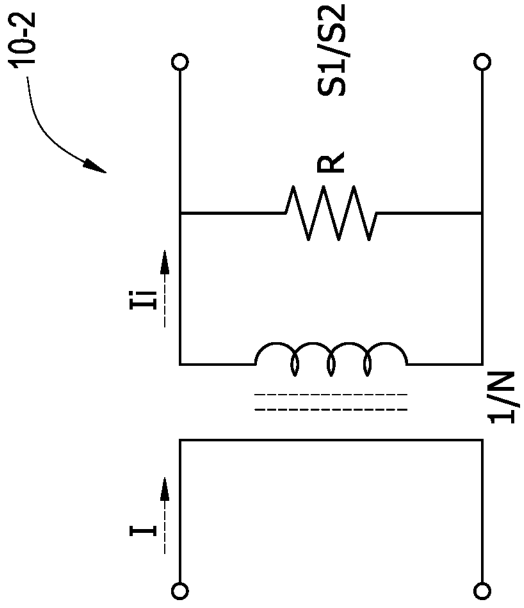
FIG. 7B is a circuit diagram of a second embodiment of the detection unit of the present disclosure.
Figure 7C:
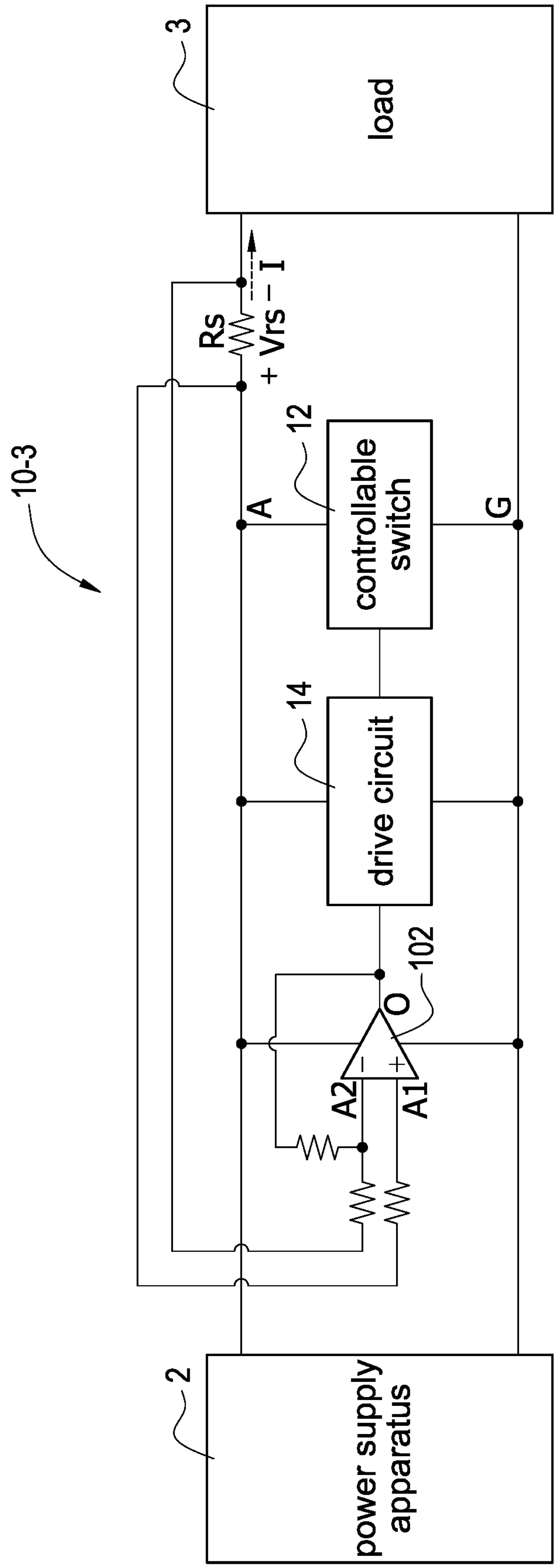
FIG. 7C is a circuit diagram of a third embodiment of the detection unit of the present disclosure.

Please refer to FIG. 7A to FIG. 7C, which show circuit diagrams of three embodiments of the detection unit of the present disclosure, and also refer to FIG. 2 through FIG. 6C. In FIG. 7A, the detection unit 10-1 is a Hall sensor, and a power input terminal IN of the Hall sensor receives a work voltage for the current detection. The signal output ends OUT of the Hall sensor provide the result of current detection, i.e., the current confirmation signal S1 or the no-load signal S2. Since the safety shutdown apparatus 1 is self-driven, the power input terminal IN, which is coupled between two ends of the controllable switch 12 or between the node B and the negative node G, receives the output voltage Vo so that the detection unit 10-1 can be driven by the voltage Vc across the controllable switch 12 or by the total voltage of the voltage Vc across the controllable switch 12 plus the clamping voltage Vcl when the controllable switch 12 is turned on. When the controllable switch 12 is turned off, the output voltage Vo is supplied to the load 3 and the detection unit 10-1. When the Hall sensor is driven and the current I flows through the Hall sensor, the Hall sensor provides the current confirmation signal S1 corresponding to the magnitude of the current I to the drive circuit 14, and otherwise the no-load signal S2 is provided by using a pull-down resistor to output the no-load signal S2 with a low level.

In FIG. 7B, the detection unit 10-2 is a through-type current transformer or a Rogowski coil. Since the detection unit 10-2 is the through-type current transformer, the detection unit 10-2 is not driven by a voltage. When a current I flows through the detection unit 10-2, an induced current Ii is induced. A voltage generated by the induced current Ii flowing through a resistor R is used as the current confirmation signal S1, and the current confirmation signal S1 is provided to the drive circuit 14, and otherwise the no-load signal S2 is provided. In FIG. 7C, the detection unit 10-3 includes a sense resistor Rs and a comparison circuit 102, and the sense resistor Rs is coupled to the power-supplying path L1. The comparison circuit 102 has a first input end A1, a second input end A2, and an output end O. The first input end A1 and the second input end A2 are respectively coupled to two ends of the sense resistor and the output end O is coupled to the drive circuit 14. When the load 3 does not draw current, a voltage Vrs across two ends of the sense resistor Rs is zero volt so that the comparison circuit 102 outputs the no-load signal S2 with a low level. When the load 3 draws current, the voltage Vrs makes the comparison circuit 102 output the current confirmation signal S1. In particular, the comparison circuit 102 can be also driven by the voltage Vc across the controllable switch 12 or by the total voltage of the voltage Vc across the controllable switch 12 plus the clamping voltage Vcl.

Figure 8:
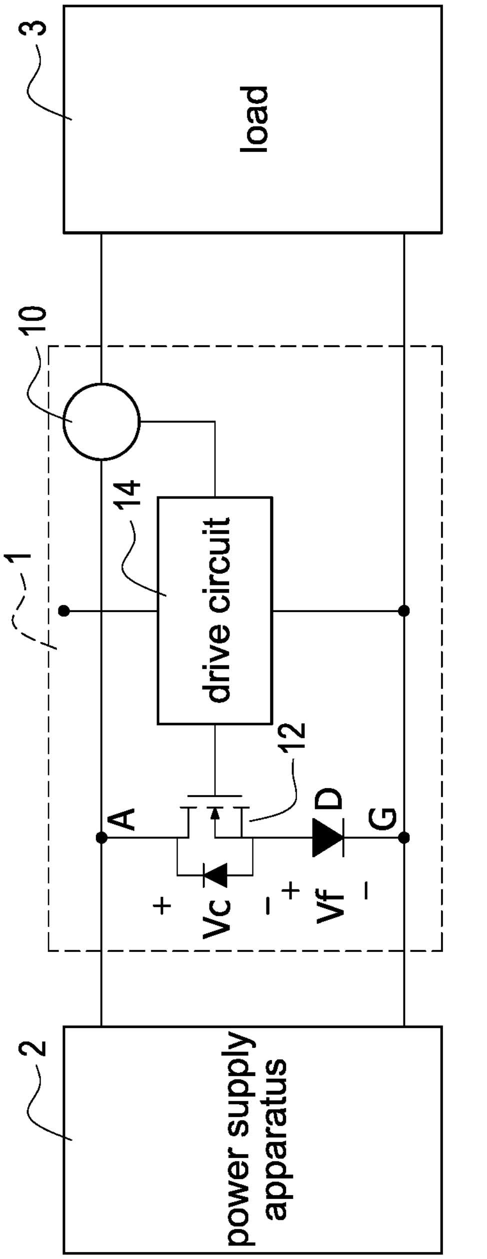
FIG. 8 is a block circuit diagram of the safety shutdown apparatus with self-driven control according to a third embodiment of the present disclosure.

Please refer to FIG. 8, which shows a block circuit diagram of the safety shutdown apparatus with self-driven control according to a third embodiment of the present disclosure, and also refer to FIG. 2 through FIG. 7C. The safety shutdown apparatus 1 further includes a diode D, and the diode D is coupled between the positive node A and the negative node G. When the short-circuit path L2 is connected, the diode D is forward biased in a direction from the positive node A to the negative node G, and a forward voltage Vf across the diode D is produced. The diode D is used to increase a voltage from the positive node A to the negative node G if the voltage Vc is insufficient to drive the detection unit 10, the comparison unit 146, and/or the comparison circuit 102 when the controllable switch 12 is turned on. In other words, when the controllable switch 12 is turned on, the output voltage Vo of the power supply apparatus 2 is increased to the sum of the voltage Vc and the forward voltage Vf. Therefore, the selection of components such as the detection unit 10, the comparison unit 146, and/or the comparison circuit is easier.

Figure 9A:
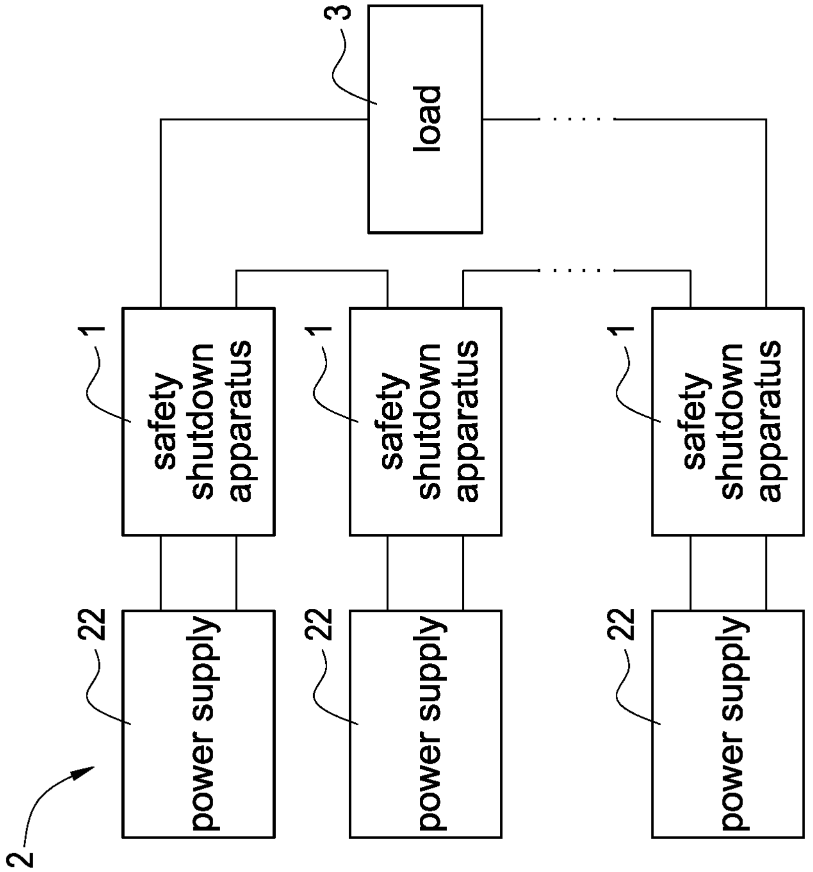
FIG. 9A is a block diagram of a power supply system having a plurality of safety shutdown apparatuses according to a first embodiment of the present disclosure.
Figure 9B:
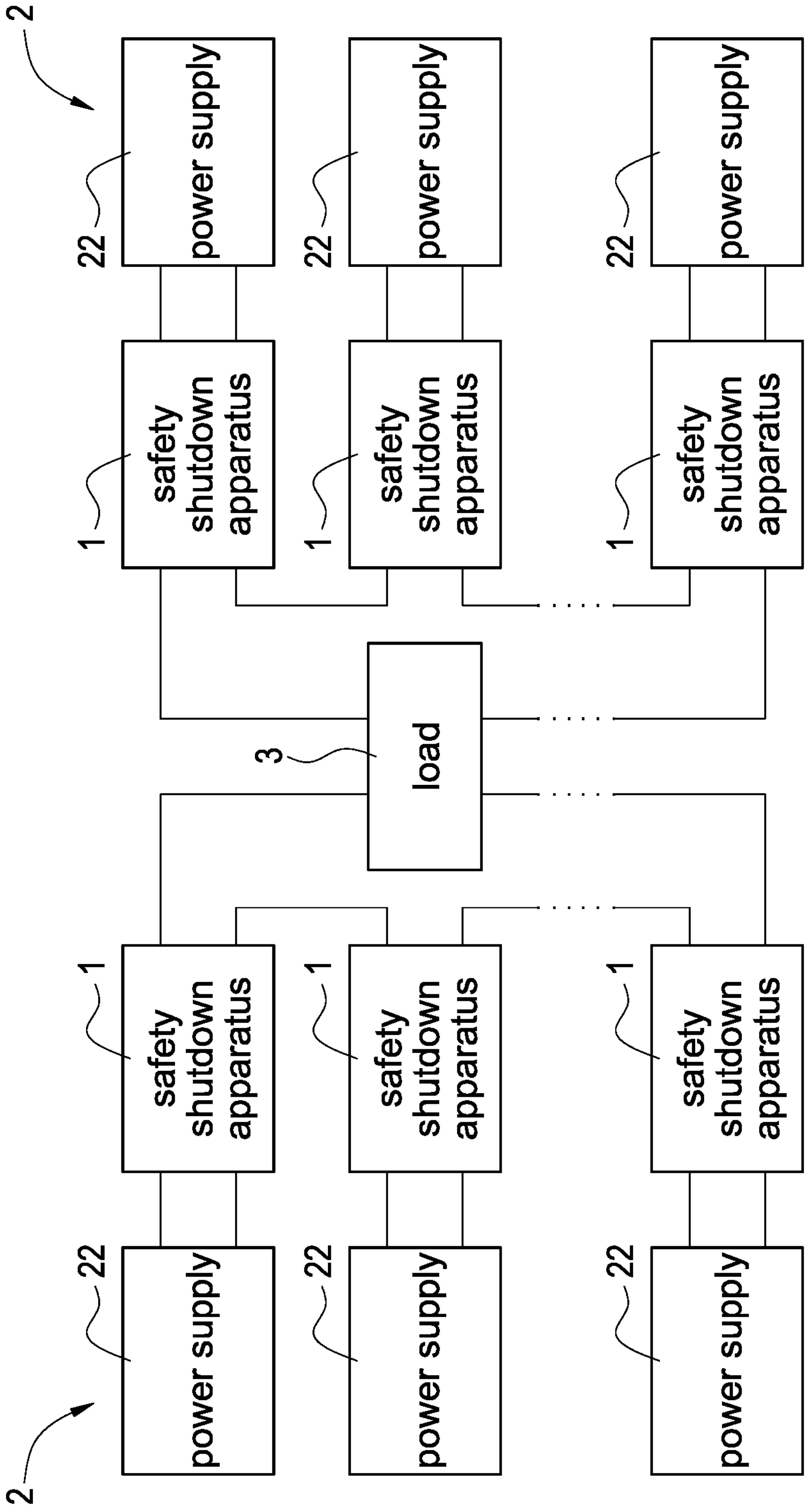
FIG. 9B is a block diagram of the power supply system having a plurality of safety shutdown apparatuses according to a second embodiment of the present disclosure.
Figure 9C:
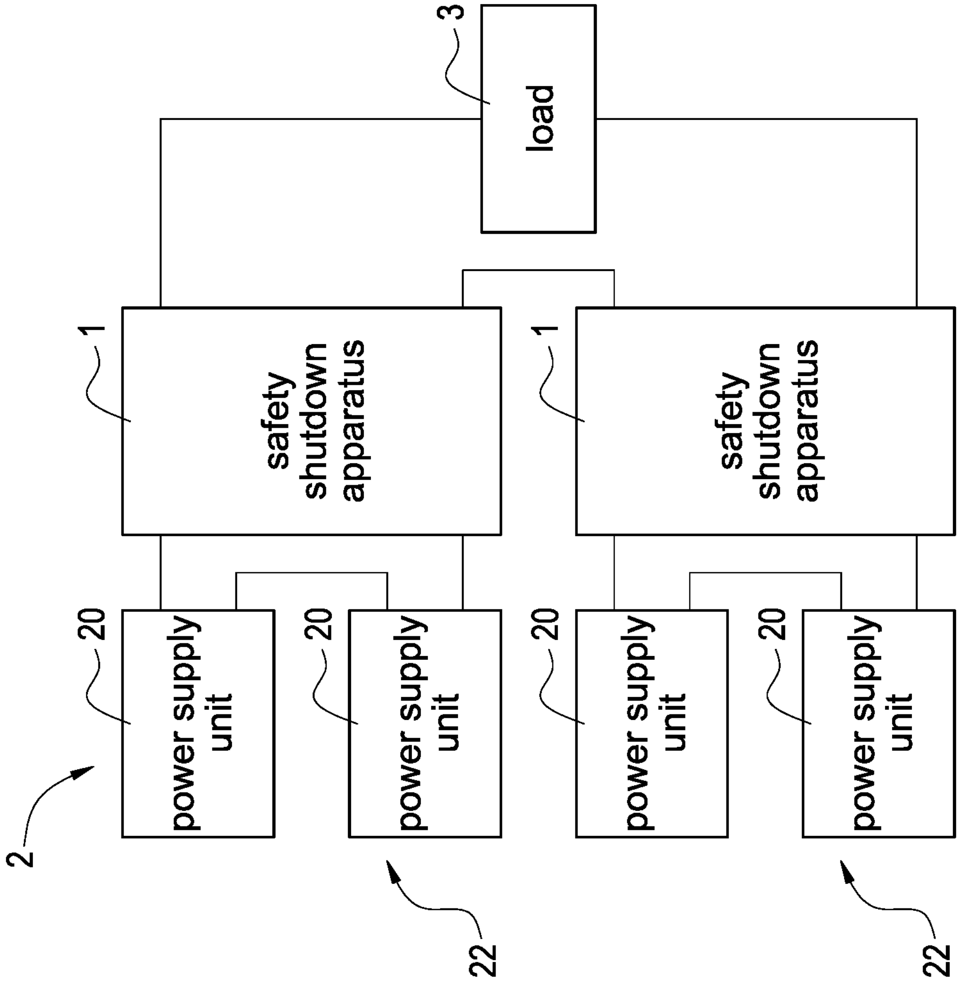
FIG. 9C is a block diagram of the power supply system having a plurality of safety shutdown apparatuses according to a third embodiment of the present disclosure.

Please refer to FIG. 9A to FIG. 9C, which show block diagrams of a power supply system having a plurality of safety shutdown apparatuses according to different embodiments of the present disclosure. In FIG. 9A, the power supply apparatus 2, which is coupled to the load 3, has multiple power supplies 22 connected in series, and each of the power supplies 22 is coupled to one safety shutdown apparatus 1. When the load 3 does not draw current, each power supply 22 can operate in the safe operation mode. In FIG. 9B, multiple power supply apparatuses 2 are provided, and the internal configuration of each power supply apparatus 2 is the same as that shown in FIG. 9A. In FIG. 9C, the power supply apparatus 2 is also provided. The difference between the FIG. 9C and the FIG. 9A is that the power supply apparatus 2 has multiple power supplies 22 and each power supply 22 has multiple power supply units 20. In FIG. 9C, two power supply units 20 jointly use one safety shutdown apparatus 1 so as to save the number of components and reduce the circuit cost and volume.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A safety shutdown apparatus with self-driven control coupled to a power-supplying path between a power supply apparatus and a load, the safety shutdown apparatus comprising:

- a detection unit coupled to the power-supplying path, and configured to generate a current confirmation signal according to a current flowing through the power-supplying path,
- a controllable switch coupled between a positive node and a negative node of the power-supplying path, and configured to provide a short-circuit path passing through the positive node, the controllable switch, and the negative node, and
- a drive circuit coupled to the detection unit, the power-supplying path, and the controllable switch, and configured to receive an output voltage provided from the power supply apparatus to turn on the controllable switch, and configured to turn off the controllable switch according to the current confirmation signal, and the drive circuit comprises:
  - a first switch coupled to the detection unit, and being turned on by receiving the current confirmation signal provided by the detection unit, and being turned off by a no-load signal provided by the detection unit when the current is not detected by the detection unit, and
  - a regulation circuit coupled to the first switch and the controllable switch, and configured to generate a first voltage according to the first switch which is turned on and generate a second voltage according to the first switch which is turned off,
  - wherein the regulation circuit coupled in parallel with the controllable switch, and having a first end and a second end, and the regulation circuit has:
    - a first resistor and a regulation unit connected in series, and
    - a node between the first resistor and the regulation unit coupled to the first switch and the controllable switch,
- wherein the controllable switch is configured to receive the first voltage to disconnect the short-circuit and connect the short-circuit path according to the second voltage,
- wherein the first end of the regulation circuit is directly coupled to the positive node, and the second end of the regulation circuit is directly coupled to the negative node, and
- wherein when the load is drawn the current, the detection unit detects the current and generates the current confirmation signal to drive the first switch to be turned on, and the first switch is turned on so that the first voltage is generated at the node, the controllable switch is turned off by the first voltage such that the controllable switch is in an open-circuit condition.

2. The safety shutdown apparatus as claimed in claim 1, wherein the first resistor having a first end and a second end, and the regulation unit having a first end and a second end; the first end of the regulation unit coupled to the first end of the first resistor, the first switch, and the controllable switch, and wherein the second end of the first resistor is coupled to the positive node, and the second end of the regulation unit is coupled to the negative node.

3. The safety shutdown apparatus as claimed in claim 1, wherein the detection unit is a Hall sensor, and a power input terminal of the Hall sensor is coupled to the controllable switch.

4. The safety shutdown apparatus as claimed in claim 1, wherein the detection unit is a current transformer.

5. The safety shutdown apparatus as claimed in claim 1, wherein the detection unit comprises:

a sense resistor coupled to the power-supplying path, and a comparison circuit having a first input end, a second input end, and an output end; the first input end and the second input end respectively coupled to two ends of the sense resistor and the output end coupled to the drive circuit.

6. The safety shutdown apparatus as claimed in claim 1, further comprising:

a path switch coupled to the power-supplying path, and configured to connect or disconnect the power supply apparatus with the load.

7. A method of controlling a safety shutdown apparatus, comprising steps of:

(a) detecting whether a current is flowing through a power-supplying path between a power supply apparatus and a load, (b) turning off a controllable switch coupled between a positive node and a negative node of the power-supplying path by a regulation circuit when the current flowing through the power-supplying path is detected, the regulation circuit coupled in parallel with the controllable switch, and having a first end and a second end, and having a first resistor and a regulation unit connected in series, and a node between the first resistor and the regulating unit coupled to the first switch and the controllable switch, the step (b) comprises steps of:

(b11) providing a current confirmation signal to turn on a first switch such that the controllable switch is in an open-circuit condition when the load is drawn the current and the current flows through the power-supplying path, (b12) generating a first voltage at the node according to the first switch which is turned on, and (b13) turning off the controllable switch according to the first voltage, and (c) turning on the controllable switch when the current is not detected, the step (c) comprises steps of:

(c11) providing a signal to turn off the first switch when the current does not flow through the power-supplying path, (c12) generating a second voltage at the node according to the first switch which is turned off, and (c13) turning on the controllable switch according to the second voltage, wherein the first end of the regulation circuit is directly coupled to the positive node, and the second end of the regulation circuit is directly coupled to the negative node.

8. The method of controlling the safety shutdown apparatus as claimed in claim 7, further comprising steps of:

turning on a second switch coupled to the power-supplying path according to the first voltage, and turning off the second switch according to the second voltage.

* * * * *